(12) United States Patent
Perry et al.

(10) Patent No.: US 8,475,863 B2
(45) Date of Patent: Jul. 2, 2013

(54) CONFECTIONERY MERINGUE

(75) Inventors: Matthew D. Perry, Ballarat (AU);
Thomas Abene, Chester, NJ (US);
Richard D. Ornelaz, Easton, PA (US);
Bruce Keen, Chicago, IL (US)

(73) Assignee: Mars, Incorporated, McLean, VA (US)

( * ) Notice: Subject to any disclaimer, the term of this patent is extended or adjusted under 35 U.S.C. 154(b) by 689 days.

(21) Appl. No.: 12/282,924

(22) PCT Filed: Apr. 3, 2007
(Under 37 CFR 1.47)

(86) PCT No.: PCT/NZ2007/000093
§ 371 (c)(1),
(2), (4) Date: Sep. 15, 2008

(87) PCT Pub. No.: WO2007/114719
PCT Pub. Date: Oct. 11, 2007

(65) Prior Publication Data
US 2011/0045158 A1   Feb. 24, 2011

(30) Foreign Application Priority Data
Apr. 3, 2006 (AU) ................ 2006901731

(51) Int. Cl.
*A23G 3/00* (2006.01)
*A23G 3/34* (2006.01)
*A23G 3/46* (2006.01)
*A23G 3/52* (2006.01)
*A23G 3/54* (2006.01)

(52) U.S. Cl.
USPC ........... 426/568; 426/564; 426/572; 426/660

(58) Field of Classification Search
USPC .......................... 426/568, 144, 564
See application file for complete search history.

(56) References Cited

U.S. PATENT DOCUMENTS

| | | | | |
|---|---|---|---|---|
| 2,132,690 A | * | 10/1938 | Hilliard | 426/144 |
| 4,488,464 A | * | 12/1984 | Rooke et al. | 83/99 |
| 4,785,551 A | * | 11/1988 | Meyer | 34/368 |
| 5,273,188 A | | 12/1993 | Sanino | 222/61 |
| 6,146,678 A | * | 11/2000 | Caridis et al. | 426/510 |
| 6,432,460 B1 | * | 8/2002 | Zietlow et al. | 426/74 |
| 2003/0148008 A1 | * | 8/2003 | Robinovitch et al. | 426/306 |
| 2003/0228397 A1 | * | 12/2003 | O'Donnell Kiely | 426/91 |

FOREIGN PATENT DOCUMENTS

| | | | |
|---|---|---|---|
| BE | 905523 A | * | 1/1987 |
| EP | 1 356 735 | | 10/2003 |
| EP | 1 576 884 | | 9/2005 |
| FR | 2 690 313 | | 10/1993 |

(Continued)

OTHER PUBLICATIONS

Sharma, Vaishali. "Bakery Series 1: Flour Composition", 2011, pp. 1-2. http://foodpathshala.ning.com/profiles/blogs/bakery-series-1-flour.*

(Continued)

*Primary Examiner* — D. Lawrence Tarazano
*Assistant Examiner* — Stephanie Cox
(74) *Attorney, Agent, or Firm* — Mars, Incorporated; Colleen Kramer

(57) ABSTRACT

A dried confectionery meringue formed from a meringue mixture having a pre-drying moisture level of between about 18% and about 30%, said mixture including a protein foaming agent, sucrose and at least one monosaccharide.

25 Claims, 3 Drawing Sheets

FOREIGN PATENT DOCUMENTS

| | | |
|---|---|---|
| JP | 62-239955 | 10/1987 |
| JP | 3-108447 | 5/1991 |
| JP | 08-173044 | 7/1996 |
| JP | 2 773 952 | 1/1998 |
| JP | 10-246674 | 9/1998 |
| JP | 2000-253823 | 9/2000 |
| JP | 2002-176918 | 6/2002 |
| JP | 2004-141096 | 5/2004 |
| JP | 2004-357643 | 12/2004 |
| JP | 2005-000124 | 1/2005 |
| JP | 2005-21024 | 1/2005 |
| JP | 2005-323531 A | 11/2005 |
| WO | WO 9319615 | 10/1993 |
| WO | WO 02/089598 A1 | 11/2002 |
| WO | WO 03/075673 A1 | 9/2003 |
| WO | WO 2004/100674 A1 | 11/2004 |

OTHER PUBLICATIONS

DTU Food. "Cocoa, powder", 2009, p. 1. http://www.foodcomp.dk/v7/fcdb_details.asp?FoodId=0035.*

* cited by examiner

CONFECTIONERY MERINGUE

FIELD OF THE INVENTION

The invention relates to the field of commercial manufacture of confectionery. In particular, the invention relates to the manufacture of a confectionery meringue which is suitable for continuous, as opposed to batch wise, manufacture.

BACKGROUND OF THE INVENTION

Confectionery manufacturers have a need to offer a range of different products in order to satisfy different consumers or the differing needs of consumers on different occasions.

In some circumstances, variety can be provided by offering different textures, even within a range of otherwise similar products. For example, manufacturers have offered 'ice-cream' versions of popular confectionery pieces. Sometimes manufacturers offer a larger dimensioned ('chunky') version of a familiar product.

An important consumer need is the desire for a 'lighter' textured product, which is not as filling as a familiar confectionery item, but which may retain the well-liked flavour profile of the original confectionery item.

One well known confectionery material which has a 'light' or less dense texture is meringue. This is typically made from egg white protein and sugar whipped together in the presence of water, the whipped mixture then being baked or dried to remove the moisture. This form of preparation has exclusively been performed in a strictly batch-wise manner, as this type of formulation tends to be poorly suited to continuous production.

For example, the aerated mixture tends to be physically delicate, requiring that it be placed on a solid surface for drying, which slows the effective drying rate. Since the aerated meringue mixture tends to be relatively slow to dry in any case due to its aerated structure, and since elevated drying temperatures tend to have a deleterious effect on the sugar and protein in the mixture, this demands that the residence time in a continuously operating oven become prohibitively long, e.g. in excess of one hour, for commercial production.

This in turn greatly reduces the ability of the commercial confectionery manufacturer to utilise this otherwise useful material in meeting the objective of providing a lighter texture candy bar, as such bars are predominately manufactured in a long, continuous run production environment. However, there has not hitherto been developed a formulation or process which addresses this problem.

Accordingly, it is an object of the invention to provide a formulation to allow the continuous commercial manufacture of a dried meringue confectionery material, and to provide a process for such manufacture. It is a secondary object of the invention to provide a candy bar which has a lighter texture, but which can be made at commercially feasible production rates, by incorporating said meringue material.

SUMMARY OF THE INVENTION

According to one aspect of the invention, there is provided a dried confectionery meringue formed from a meringue mixture having a pre-drying moisture level of between about 18% and about 30%, said mixture including a protein foaming agent, preferably egg white protein, sucrose and a source of monosaccharides. Preferably, the sucrose is icing sugar.

By 'meringue' is meant a confectionery which is characterised by its light, 'brittle' or 'crunchy' texture, provided by an aerated matrix of sucrose and protein (usually egg white protein) formed in a substantially aqueous state and then dried.

The major advantage of the inventive meringue is that it can effectively be extruded and dried in a continuous manner. The moisture level in the meringue mixture is lower than that of typical meringue mixtures, which facilitates broadly continuous manufacture, as opposed to discrete batchwise manufacture, of the meringue product in a manner which is substantially more difficult to achieve with typical higher moisture level formulations known in the prior art. In particular, the inventors have devised a meringue mixture which can achieve the requisite drying performance, but in which the solids can nevertheless be sufficiently suspended and/or hydrated.

It has been found that by keeping the moisture levels in the pre-extruded meringue mixture between about 18% and about 30%, it is possible to dry the mixture at an economically feasible rate while still achieving the target final meringue moisture level of less than 2% by mass on an as is basis, as the rheology of the mixture is sufficiently 'stiff' to allow it to be extruded onto a wire mesh belt, greatly enhancing the ability of the continuous oven to remove the moisture from the meringue. In addition, the lower initial moisture level reduces the duty of the oven.

By 'icing sugar' is meant sucrose (or similar sugar) having a finer particle size than caster sugar (also known as baker's sugar). In particular, the sucrose should have the following sieve analysis or finer: 10.0% maximum retained on a 106 micron sieve; 50.0% maximum retained on a 212 micron sieve. Preferably, the sieve analysis is: 4.0% maximum retained on a 212 micron sieve; 35.0% maximum retained on a 106 micron sieve. Even more preferably, the sieve analysis should be: 2.0% maximum retained on a 212 micron sieve; 26.0% maximum retained on a 106 micron sieve.

This particular particle size range of the sucrose in the meringue allows a smoother texture to be achieved at the lower moisture level required by the invention, as the sugar can be sufficiently hydrated at a rate which allows continuous production of meringue. If these solids are not suspended effectively, the meringue mixture will not be sufficiently flowable to be processed in the required manner, and the final mouthfeel of the meringue will be gritty, due to the presence of crystalline sugar particles in the meringue matrix. These particles tend to cause the abovementioned undesirable 'grainy' mouth-feel as well as a 'spotty' surface appearance. Advantageously, said sucrose is included in said meringue mixture in a concentration of 45% to 65% by mass (wet basis), preferably about 56%.

It has been found that this finer grade of crystalline sucrose melts/dissolves more rapidly than coarser grades, which facilitates the more rapid drying of the extruded meringue mixture required of the continuous process. It has been found that coarser grades of sucrose do not "melt-out" in time, thereby producing a 'spotty' meringue.

It is also possible to use the US particle size distribution for 'icing sugar', which is typically expressed as 1% retained on a 149 micron sieve (U.S. Sieve Number 100); 10% maximum retained on a 74 micron sieve (U.S. Sieve Number 200).

The presence of monosaccharides assists in preventing the meringue mass becoming too "crystalline". Monosaccharides have been observed to act to make the meringue mass more flexible/less brittle and tend to give the meringue mass a smoother appearance after drying.

The absence of the monosaccharides results in a product that tends to case-harden during baking, a phenomenon where the product forms a dry outer shell which traps the remaining moisture inside the product. This results in a product that either does not dry sufficiently, or which splits open in order to release the moisture trapped inside the case-hardened shell.

The source of monosaccharides may be selected from a wide variety of monosaccharides well known to the skilled person, including but not limited to malt extract liquid, corn syrup, glucose syrup, invert sugar, honey or similar material, or any suitable combination thereof.

Advantageously, the mixture further includes cocoa powder. The inherent bitterness of the cocoa powder significantly dulls the sweetness of the meringue, which can be overly sweet due to relatively high levels of sucrose.

According to another aspect of the invention, there is provided a dried confectionery meringue formed from a meringue mixture including: between about 45% to 65% sucrose; between about 1% to 20% of at least one monosaccharide; between about 3% and 15% egg white protein; and a pre-drying moisture level of between about 18% and about 30%.

Preferably, there is provided a dried confectionery meringue formed from a meringue mixture including: between about 50% to 60% sucrose; between about 8% to 12% of a source of monosaccharides; between about 7% and 9% egg white protein; and a pre-drying moisture level of between about 18% and about 30%.

According to another aspect of the invention, there is provided a method of continuously manufacturing a dried confectionery meringue, said method including the steps of:

combining and mixing a protein foaming agent, preferably egg white or egg white powder, sucrose, preferably icing sugar, at least one monosaccharide, and optionally cocoa powder and salt, with sufficient water to form a mixture having a moisture content of between about 18% and about 30% by mass;

aerating the mixture to a density of between about 0.20 and 0.40 kg/liter;

extruding the aerated mixture onto a conveyor which allows air to circulate through said conveyor, for example a wire mesh belt;

continuously drying the extruded mixture, by passing said belt through an oven, to a total moisture level of between about 0.5% and 2% by mass.

The ability of this basic meringue formulation to be successfully extruded onto a relatively air permeable conveyor, such as a wire mesh belt, is a key to the ability of the invention to provide a continuously manufacturable meringue, since the ability of the hot air in the oven to circulate entirely around the extruded mixture is crucial in being able to remove sufficient moisture from the mixture at a rate which allows the product to be dried in a reasonable residence time in the oven.

Advantageously, and particularly so where the mixture is aerated to a lower density of about 0.20 and 0.30 kg/liter, the meringue mixture may be wire cut to shape prior to entering the oven. This is a technique which may allow a variety of shapes and sizes of the meringue to be manufactured and which has not been hitherto available to manufacturers of meringue products at commercially feasible production rates.

One highly desirable extrusion profile which is enabled by the invention is where the mixture is extruded to form a cross section with internal voids, for example a hollow tube.

Similarly, the invention enables crimping or forming of the dried meringue immediately post-oven to produce a series of friable meringue pieces, or alternatively passing the meringue through a pip roller to produce discrete meringue pieces.

According to another aspect of the invention, there is provided an item of confectionery including an enrobed core, said core including at least one layer of a dried confectionery meringue according to that described above. The meringue provides a lighter texture for the confectionery item as a whole, due to its relatively low density and characteristic texture.

According to another aspect of the invention, there is provided the use of a dried confectionery meringue, as described above, when substituted for a more dense component in a commercial confectionery product, said confectionery product manufactured in a continuous process, to provide a less dense texture to the confectionery product as a whole. This is a valuable aspect of the invention, in that it allows a meringue product to be used in this manner, where it has not been economically feasible to do so in the past.

Now will be described, with reference to indicative, non-limiting examples, a preferred embodiment of the invention.

DETAILED DESCRIPTION OF A PREFERRED EMBODIMENT

The invention provides a formulation for a confectionery meringue which is suitable for continuous production, in particular continuous extrusion in desired shapes onto a wire mesh belt followed by continuous passage through a drying oven.

The formulation is provided having a formulated moisture level of between about 18% and about 30% by mass; including sucrose having a particle size distribution similar to that of icing sugar, and further including a source of monosaccharides.

Typically meringues have a formulated moisture content of about 40% by mass. At this level that tend to be relatively soft, sticky and flowable, even upon aeration, to the extent that they would be expected to sag or run through an air-permeable conveyor, such as a wire mesh belt, rather than be supported by the conveyor. The reduced moisture content provided by the invention modifies this rheology to the extent that baking/drying on, for example, a wire mesh belt is feasible.

Typically, meringue formulations use coarser grades of sucrose, such as caster or standard sugar. However, the finer grade 'icing sugar' is used in the invention because the finer grains tend to melt/dissolve faster. This contributes greatly in allowing the meringue to be manufactured easily at commercial rates. In addition, coarser grades of sugar do not "melt-out" in time and tend to produce a 'spotty' and/or gritty meringue.

One or more monosaccharides, such as malt extract syrup, are provided in the inventive formulation, as it has been found that the presence of a sufficient level of monosaccharides seems to prevent the meringue mass becoming too "crystalline". Monosaccharide sugars tend to make the meringue mass more flexible or less brittle, and seem to give the meringue mass a smoother appearance after drying. The absence of this component tends to result in a product that is typically cracked and/or broken, and which may dry unevenly.

The other main components of the meringue mixture are egg white protein, which provides the structural protein to maintain the aerated structure, and water.

An optional component is cocoa, whose natural bitterness tends to dull the overt sweetness of the relatively high concentration of sucrose, as well as providing a pleasant 'chocolate' brown colour.

Figure 1:
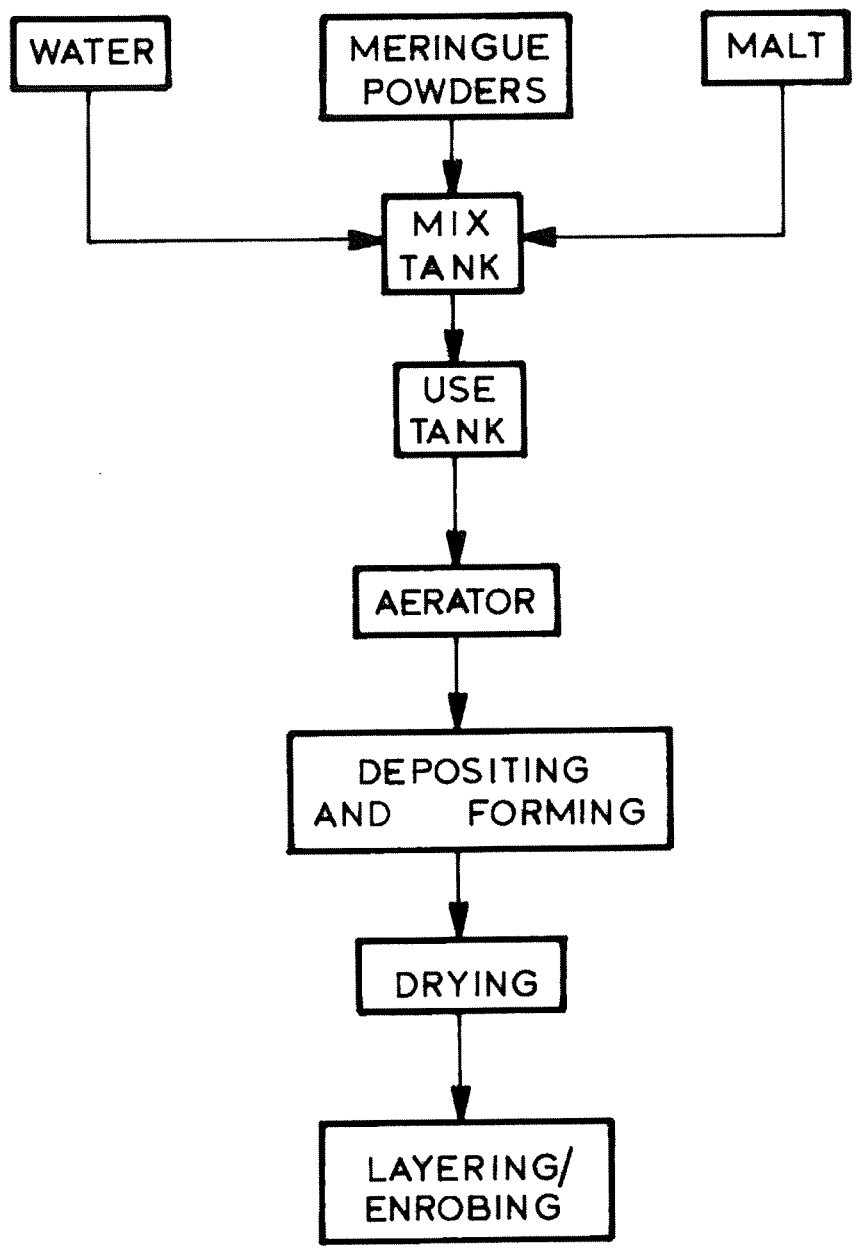
FIG. 1 shows a flowchart of a preferred process for producing a candy bar including a meringue material according to the invention.

The meringue is formed according to the process broadly illustrated in FIG. 1. The ingredients are combined and mixed, typically in mixing equipment well known to those in the art, which may be jacketed to cool the mixture to around 10° C., which assists in the aeration stage. This mixture is then fed in to an aerator which effectively 'whips' air into the mixture to produce a relatively stable foam which can be extruded (simply pumped through a nozzle) while retaining the shape of the nozzle profile. In this way, many different meringue profiles may be provided by different nozzle profiles, optionally in conjunction with other forming techniques well known to the skilled person, such as wire cutting.

The mixture is extruded as a rope on to a moving conveyor which is relatively air permeable, such as a wire mesh belt, thereby to allow air in the subsequent drying step to circulate fully around the product thereby to encourage even and efficient removal of moisture from the mixture. This is a crucial factor in enabling continuous manufacture of the meringue product, as opposed to the batchwise manufacturing known in the prior art. Those skilled in the art are familiar with a number of different designs and materials for such belt which would meet the need of this step.

Drying is effected in an oven or dryer hood which is arranged to receive the moving belt and which can provide heating means, preferably to heat distinct zones of the oven, sufficient to reach temperatures of up to 160° C. The mixture is dried to a moisture content of around 0.5% to 2.0% total moisture, as measured, for example, by NIR spectroscopy.

Once the meringue rope emerges from the oven, it may be cut to size and is then taken for further processing well known to the skilled person such as chocolate enrobing.

Now follows a specific example where the inventive meringue formulation was used to produce a meringue product which was substituted for a more dense nougat component in a confectionery bar, giving the bar a 'lighter', less dense texture and mouthfeel.

EXAMPLE 1

Candy Bar with Lighter Texture

The following description relates to a confectionery bar which was designed to provide a 'lighter' texture variant for a confectionery bar based on a chocolate-enrobed core. Such confectionery bars are well known in the art. Prominent examples include the confectionery bars marketed under the brands MARS® and TWIX® by Effem Foods Pty Ltd, 53 Kelly St, Wodonga, Victoria 3690, Australia.

Figure 2:
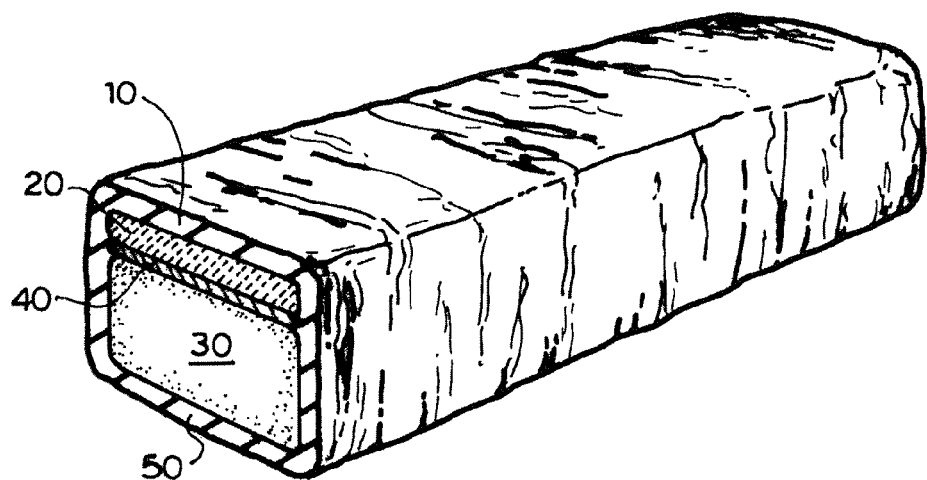
FIG. 2 shows a schematic cross-sectional view of the candy bar produced by the process shown in FIG. 1.

The confectionery as shown in FIG. 2, features a core 10 consisting of an upper caramel layer 20, a lower meringue layer according to the invention 30, which has been prepared in accordance with the process shown in FIG. 1, and an intervening barrier fat layer 40, of a kind well known in the art, said fat layer intended to avoid moisture migration between the aforesaid caramel and meringue layers. The core 10 is enrobed in chocolate 50. It should be noted that the relative proportions of the meringue, caramel, barrier fat and chocolate are purely for illustration, and many other relative proportions of each may be selected by the skilled person.

When compared with, for example, a MARS® brand chocolate bar, the lighter texture is achieved by the substitution of the lower nougat layer of the MARS® bar with a layer of the inventive meringue.

The composition of the meringue is given in Table 1 below.

TABLE 1

| Ingredient | % mass (wet basis) |
| --- | --- |
| Sucrose (Icing Sugar) | 55.72 |
| Liquid Malt Extract | 10.00 |
| Egg White Protein Powder | 7.96 |
| Cocoa Powder | 2.39 |
| Salt (Sodium Chloride) | 0.03 |
| Water | 23.9 |

The meringue, as it appeared in the completed bar, may appear similar to a prior art meringue material, having a moisture level of about 0.5% to 2%. However, the inventive meringue contains two main differences to the typical prior art meringue material:
- the meringue was formed from a low moisture meringue mixture, i.e. having a pre-drying moisture content of about 18-30%; and
- the sucrose in the meringue was supplied at a substantially lower particle size than for typical prior art meringue products.

The lower moisture of the meringue mixture assisted in the manufacture of the inventive confectionery bar at high production rates as it lowered the duty of the drying apparatus, and thereby alleviated the major obstacle to the manufacture of meringue at high rates.

The sucrose was supplied to the formulation at the following particle size distribution: 2.0% maximum retained on a 212 micron sieve; 26.0% maximum retained on a 106 micron sieve. This is familiarly known in the art as 'icing sugar' and is substantially finer than caster sugar or other grades of sucrose typically used in meringue manufacture.

The role of the lower particle size was to ensure that the texture of the meringue remained smooth, in spite of the lower moisture levels in the formulation. If a larger sucrose particle size was used (e.g. 'caster sugar' as it is known in the art), the crystals would tend to not fully dissolve in the mixture due to less available water, and due to the potentially lower hydration time necessitated by manufacture at higher rates. This failure to dissolve would result in the meringue having an undesirable 'gritty' texture.

Egg white protein powder is a white to cream coloured powder prepared by spray drying fresh, liquid chicken egg whites after the removal of the reducing sugars. The powder is then pasteurized. In this formulation, its role is to provide structure to the sucrose mixture in aeration, by entraining the air.

The water in the formulation was used to hydrate the dry ingredients prior to aeration of the resulting mixture. Egg albumen protein formed a substantial proportion of the egg white protein powder, and provided significant foaming properties to the egg white protein overall.

Liquid malt extract was prepared by macerating coarsely powdered barley malt with water at a temperature not exceeding 75° C., straining and evaporating the resulting liquid in a vacuum pan until the liquid is of the consistency of thick honey. The grist comprised a high proportion of malted barley as a constituent of the mash in order to produce a malt extract with a medium amber colour.

In this formulation, its role was to provide aesthetic colour and flavour to the meringue, as well as to facilitate processing, prevent case-hardening in the oven, and produce a consistent, smooth meringue with sufficient flexibility post-drying to cope with further processing without shattering or cracking.

The cocoa powder described in this specification was manufactured from pressed cocoa cake, which may be lightly alkalised to achieve the desired colour. In this formulation, its role was also to provide aesthetic colour and flavour to the meringue, in particular to temper the high level of sweetness provided by the sucrose.

The meringue mixture was prepared first by combining the dry ingredients, as shown in table 2, with sufficient water for the mixture to have a moisture content of 23% to 25% (target 24%) in a jacketed mixing tank.

TABLE 2

| Ingredient | % mass |
| --- | --- |
| Egg white powder | 12.05 |
| Icing Sugar | 84.28 |
| Salt (Sodium Chloride) | 0.05 |
| Cocoa powder | 3.62 |

The temperature of the meringue mix in the mixing tank was controlled to 10-12° C. This temperature ensured that the mass did not overheat unnecessarily and minimised any microbial growth prior to usage. The raw meringue mixing tank provided gentle intermittent stirring to prevent settling and minimising premature aeration.

The raw meringue was then pumped from the usage tank to a Mondomix aerator (Model VS15; supplied by Haas-Mondomix BV, of Damsluisweg 41, Almere, The Netherlands). A level sensor located in the extruder hopper, (downstream of the aerator) automatically adjusted the speed at which raw meringue was pumped through the aerator.

The aerator operated at a pressure of between 0-7 Bar. Meringue mix temperature was controlled to between 10 and 20° C. The cold water jacketing temperature of the aerator was set between 7-12° C.

Raw meringue was pumped to the aerator, where it was introduced into the aerator in conjunction with compressed air: the two are combined by the action of the aerator. A back-pressure valve held the product in the aeration chamber for the appropriate amount of time and in doing so controlled the level of aeration.

The aeration was designed to produce a relatively stiff aerated meringue mix having a target density of 0.38 kg/liter.

The aerated meringue mass was pumped directly to a feed hopper for the extruder.

The extrusion hopper is preferably "wedge shaped" in order to direct the meringue mass onto the extrusion gears. The design of the extruder was such that geared sprockets "picked up" and direct the meringue mass down through slots in a nozzle plate. The meringue passed out of the slots & fell directly as long ropes onto a moving wire mesh belt. For the present example, there were nineteen rectangular slots, having dimensions as follows: 17 mm wide×5.6 mm high; no radius in the corners. Total individual nozzle area is 95.2 mm$^2$ and total overall nozzle area was 1,809 mm$^2$.

Figure 3:
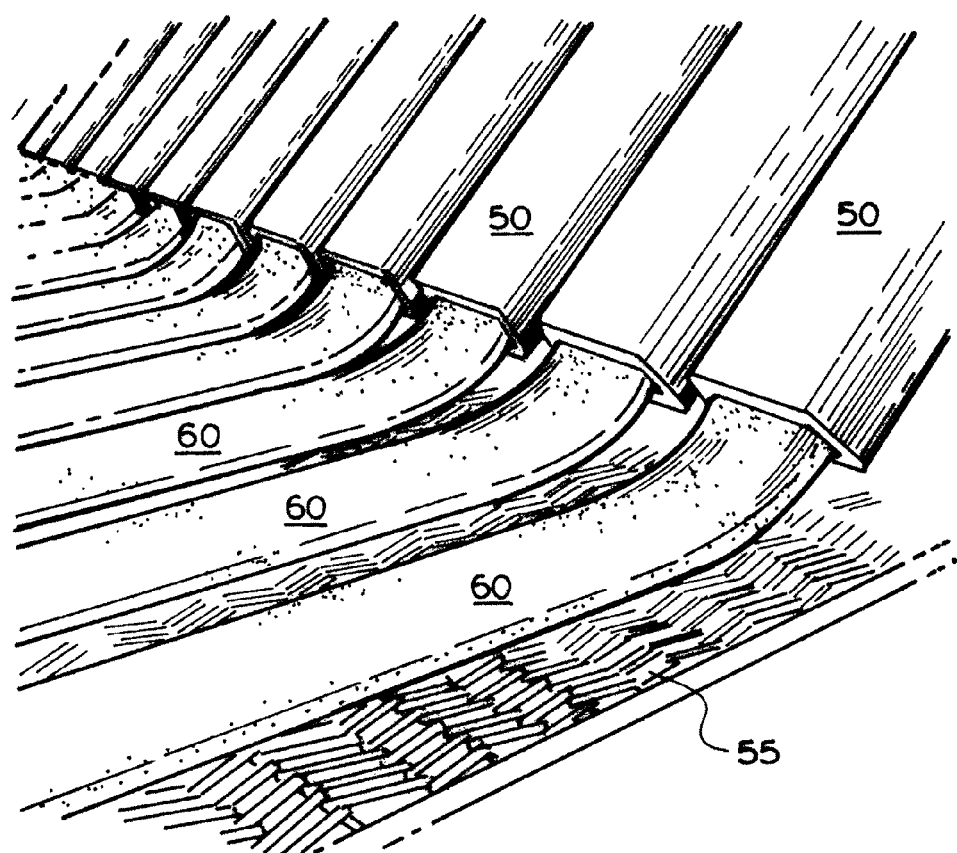
FIG. 3 shows a view of the meringue material for inclusion in the candy bar of FIG. 2 being extruded.

FIG. 3 illustrates the extrusion process in action. The extrusion nozzles 50 were arranged above a moving wire mesh conveyor belt 55. The extruded aerated meringue 60 fell onto the belt 55 whilst retaining its rectangular profile. As the belt 55 moved away from the nozzles 50, the aerated meringue 60 was formed into long ropes of consistent cross-sectional dimensions.

After drying, the total moisture level of the raw meringue was targeted to be in the range 0.5% to 2%. This was achieved by passing the wire mesh belt through a four-zone direct gas-fired oven. The belt speed was set at about 1.5 m/minute and the set point temperatures of the four zones are given in Table 3 below.

TABLE 3

| Oven Zone | Set Temp. (° C.) |
| --- | --- |
| 1 | 128 |
| 2 | 148 |
| 3 | 158 |
| 4 | 110 |

The line speed of the oven typically can range between 1.0 m-3.0 m minute, depending on the required baking/drying conditions.

It is not essential to the working of the invention that the oven has precisely four temperature zones. The skilled person will be able to configure the temperature profile of ovens having differing numbers of temperature zones to produced the desired result.

Critical to the evenness of the drying process is that the oven belt is a highly air-permeable material. A solid belt, for example, does not allow for even migration of the moisture from the meringue into the heated air. In this example, the oven was 13 m long & the residence time inside the oven, at a belt speed of 1.5 m/minute was 8.5 minutes. Each zone was approximately 3.25 m long.

Setting the successive zone temperatures so that the meringue experienced a gradual rise in temperature as it passed through the oven allowed for moisture loss to occur without case hardening at the product surface. A lower final zone temperature allowed for the extruded mass to cool slightly before exiting the oven.

At the point at which the wire mesh belt began to dip and return through the oven, the meringue rope lifted without breakage from the wire mesh belt and passed easily onto a subsequent conveyor for further processing.

This further processing included techniques well known in the art, including the application of the fat barrier layer to the top of the meringue; applying a layer of another confectionery material (in this case caramel) above the barrier layer and cutting the bar to length and enrobing in chocolate.

EXAMPLE 2

Tubular Meringue

The rheology of the inventive meringue formulation is anticipated to allow the extrusion of a variety of different shape profiles, including for example those with internal voids or hollow features. The internal void may be left open, or alternatively filled with another confectionery component such as chocolate cream.

In this example, a tubular meringue was continuously produced, which provided a novel and unique candy bar format. The composition of the meringue is given in Table 4 below.

TABLE 4

| Ingredient | % mass (wet basis) |
| --- | --- |
| Sucrose (Icing Sugar) | 55.42 |
| 41 DE Corn Syrup | 10.00 |
| Egg White Protein Powder | 7.96 |

TABLE 4-continued

| Ingredient | % mass (wet basis) |
|---|---|
| Cocoa Powder | 2.39 |
| Vanilla Flavour | 0.30 |
| Salt (Sodium Chloride) | 0.03 |
| Water | 23.9 |

The meringue was prepared by similar process steps as per that of Example 1. The density of the meringue mixture was targeted at 0.20-0.30 kg/liter.

To produce the tubular shape, the meringue mixture was extruded through a nozzle having a circular profile, with a cone-shaped insert placed at the centre of the nozzle, providing an annular orifice of outer diameter of 17 mm and inner diameter of 12 mm. FIG. 5 illustrates the type of extrusion nozzle which was employed to produce the tubular extrusion of FIG. 4. The nozzle 200 consisted of an outer tubular wall 210, inside which is located, by support arms 220, a cone-like baffle 250 which was arranged to have its apex directed toward the meringue mix as it was extruded. The meringue was forced around the baffle 250 and emerged as a tube from the annular orifice 240 created by the positioning of the baffle 250 inside the tubular wall 210.

The meringue was extruded onto a moving wire mesh belt as described above in example 1.

The tube of extruded meringue was dried in a four-zone direct gas fired oven, at an oven residence time of about 12.3 minutes, to a target moisture level of about 1.5%. The set point temperatures of the four zones are given in Table 5 below.

TABLE 5

| Oven Zone | Set Temp. (°) |
|---|---|
| 1 | 121 |
| 2 | 138 |
| 3 | 138 |
| 4 | 141 |

Figure 4:
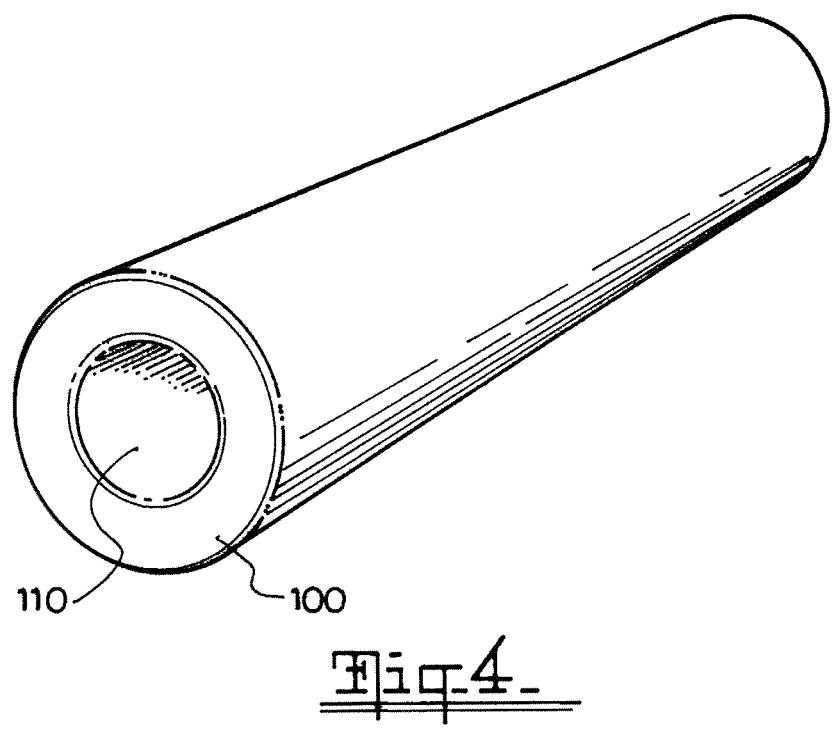
FIG. 4 is an orthogonal view of the tubular extruded meringue according to the invention.
Figure 5:
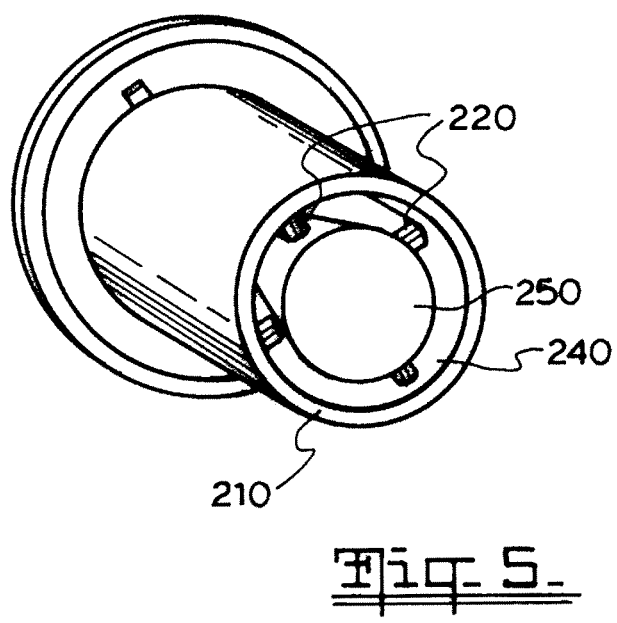
FIG. 5 shows a schematic view of a nozzle for producing the tubular meringue of FIG. 4.

FIG. 4 illustrates the tubular meringue produced as described above. It has an annular cross section 100, with an inner tubular void 110 which extends throughout the extrusion. This may undergo further processing as per Example 1, and also affords the opportunity to fill the internal void thereby produced with another suitable confectionery material, such as chocolate cream.

It will be clear to those skilled in the art that other alternative processes and nozzles may be employed to produce different sizes, shapes and arrangements of voids.

A further alternative process step enabled by the inventive product and process is to wire cut the meringue to particular sizes or novelty shapes before drying. This may require a slightly more aerated meringue: a pre-oven density of about 0.30 kg/liter. However the shape stability afforded by the invention makes this step possible, in spite of the relatively higher production rates targeted.

Depositing the meringue as individual pieces on to the belt before entering the drying oven may also be contemplated.

Another alternative extrusion profile would be to produce a relatively wide, flat sheet of meringue.

Other alternative process steps pre- or post-oven include the crimping or part-scoring of the meringue, to enable easy break-up of the pieces by the consumer; or processing ropes or sheets via a 'pip-roller' to produce individual pieces.

It will be appreciated by those skilled in the art that the above example represents merely one way in which the advantages of the invention may be realised. There are likely to be numerous variations of the formulation and specific processing steps which will result in a product remaining within the spirit and scope of the invention.

The invention claimed is:

1. A method of continuously manufacturing a dried confectionery meringue comprising:
    (a) combining egg white or egg white powder as a protein foaming agent, icing sugar, and at least one monosaccharide with sufficient water to form a mixture having a moisture content of between about 18% and about 30% by mass;
    (b) aerating the mixture to a density of between about 0.20 and 0.40 kg/liter, wherein the protein component of said mixture consists of egg white or egg white powder;
    (c) extruding the aerated mixture as a rope, tube or sheet onto a substantially air-permeable conveyor;
    (d) drying the extruded rope, tube or sheet to a total moisture level of between about 0.5% and 2% by mass; and
    (e) forming the dried rope, tube or sheet into a series of friable pieces.

2. The method of claim 1, wherein the rope, tube or sheet is extruded having internal voids.

3. The method of claim 2, wherein the rope, tube or sheet is extruded in the form of a hollow tube.

4. The method of claim 1, wherein said forming includes passing the dried rope, tube or sheet through a pip roller.

5. The method of claim 1, further comprising enrobing the dried friable pieces of meringue in chocolate.

6. The method of claim 3, wherein the method further comprises filling the hollow tube with another confectionary material.

7. The method of claim 6, wherein the confectionary material used to fill the hollow tube comprises chocolate cream.

8. The method of claim 6, further comprising enrobing the filled tube with chocolate.

9. The method of claim 1, further comprising application of a fat barrier layer to the dried friable pieces of meringue.

10. The method of claim 6, further comprising application of a fat barrier layer to the filled tube of meringue.

11. The method of claim 9, further comprising enrobing the dried, rope tube or sheet of meringue comprising a fat barrier layer in chocolate.

12. The method of claim 10, further comprising enrobing the filled tube of meringue in chocolate.

13. The method of claim 9, further comprising applying a layer of another confectionary material to the dried friable pieces of meringue comprising the fat barrier layer to form a layered meringue.

14. The method of claim 10, further comprising applying a layer of another confectionary material to the filled tube of meringue comprising the fat barrier layer to form a layered meringue.

15. The method of claim 13, wherein the layered confectionary material comprises caramel.

16. The method of claim 14, wherein the layered confectionary material comprises caramel.

17. The method of claim 13, further comprising enrobing the layered meringue in chocolate.

18. The method of claim 14, further comprising enrobing the layered meringue in chocolate.

19. The method of claim 1, wherein the drying step is conducted in an oven comprising multiple zones.

20. The method of claim 19, wherein the multiple zones are set to successive temperatures so that the extruded rope, tube or sheet experiences a rise in temperature.

21. The method of claim 20, wherein the final zone is set to a lower temperature than the preceding zone.

22. The method of claim 21, wherein the final zone is set to a lower temperature than all preceding zones.

23. The method of claim 19, wherein the oven comprises 4 zones.

24. The method of claim 19, wherein the line speed of the air permeable conveyor through the oven is from 1.0 meter to 3.0 meters per minute.

25. The method of claim 1, wherein the icing sugar has a particle size distribution of 1% retained on a 149 micron sieve 10% maximum retained on a 74 micron sieve.

* * * * *